United States Patent [19]

Bailey et al.

[11] Patent Number: 5,471,410
[45] Date of Patent: Nov. 28, 1995

[54] METHOD AND APPARATUS FOR STICKY AND LEADING ONE DETECTION

[75] Inventors: Roger N. Bailey; Steven M. Burchfiel; Michael P. Taborn, all of Austin, Tex.

[73] Assignee: International Business Machines Corporation, San Antonio, Tex.

[21] Appl. No.: 323,476

[22] Filed: Oct. 14, 1994

[51] Int. Cl.⁶ .................. G06F 7/00; G06F 7/38
[52] U.S. Cl. .................. 364/715.01; 364/748
[58] Field of Search .............. 364/715.04, 745, 364/748, 715.01

[56] References Cited

U.S. PATENT DOCUMENTS

| | | | |
|---|---|---|---|
| H1222 | 8/1993 | Brown et al. | 364/748 |
| 4,509,144 | 4/1985 | Palmer et al. | 364/900 |
| 4,562,553 | 12/1985 | Mattedi et al. | 364/748 |
| 4,864,527 | 9/1989 | Peng et al. | 364/748 |
| 4,994,996 | 2/1991 | Fossum et al. | 364/748 |
| 4,999,796 | 3/1991 | De Witt et al. | 364/715 |
| 5,237,525 | 8/1993 | Rossbach | 364/766 |
| 5,304,994 | 4/1994 | Heikes | 341/50 |
| 5,317,527 | 5/1994 | Britton et al. | 364/715 |
| 5,341,319 | 8/1994 | Madden et al. | 364/748 |

Primary Examiner—Tan V. Mai
Attorney, Agent, or Firm—Donald R. Comuzzi; Christopher L. Makay

[57] ABSTRACT

An apparatus for detecting sticky and a leading one includes first circuitry capable of detecting both sticky and a leading one. The apparatus further includes second circuitry that determines whether a sticky or a leading one detect is required. Depending upon that determination, the second circuitry controls the first circuitry to perform a sticky detection or a leading one detection. A method practiced by the apparatus includes the steps of detecting either sticky or a leading one utilizing the same circuitry, determining whether a sticky or a leading one detect is required, and controlling the circuitry in accordance with the determination of whether a sticky or a leading one detect is required.

30 Claims, 2 Drawing Sheets

METHOD AND APPARATUS FOR STICKY AND LEADING ONE DETECTION

BACKGROUND OF THE INVENTION

1. Field of the Invention

The present invention relates to floating point units and, more particularly, but not by way of limitation, to a method and apparatus for sticky and leading one detection.

2. Description of the Related Art

Floating point units perform various arithmetic operations such as addition, subtraction, multiplication, division, square root on numerical operands represented in floating point notation. Floating point notation utilizes the format of a sign, a mantissa, and an exponent to represent a number. Floating point units recognize floating point numbers because floating point numbers include a predetermined bit field with the sign, mantissa, and exponent each occupying the same bit positions regardless of the sign and magnitude of the actual number. Thus, a floating point unit ascertains the sign, mantissa, and exponent for any input floating point number by decoding bit positions and then determining the sign, the numeric value of the mantissa, and the magnitude of the exponent from the decoded bits representing the floating point number.

The IEEE promulgates standards (specifically the ANSI/IEEE 754-1985) that govern the representation of numbers in floating point notation to ensure uniformity among floating point notation users. The IEEE standards include extended, double, and single precision formats. Denormalized formats are also included in the standard but will not be discussed in relation to this invention. Those formats determine the quantity of significant figures or size of the bit field for any number represented in floating point notation. For example, a double precision format defines 64 bits for operands with one bit representing the sign, eleven bits representing the magnitude of the exponent, and 52 bits representing the numeric value of the mantissa. Alternatively, a single precision format defines 32 bits for operands with one bit representing the sign, 8 bits representing the magnitude of the exponent, and 23 bits representing the numeric value of the mantissa.

Regardless of the particular floating point notation format utilized, the IEEE standard demands the normalization of the mantissa for all operands as well as any results from an arithmetic operation performed on the operands. Normalization of a floating point number requires the leading one in the mantissa always be placed to the left of the decimal point with the magnitude of the exponent adjusted accordingly. Consequently, the IEEE standard places the leading one in the most significant bit of the mantissa bit field so that the leading one appears not included and is referred to as a "hidden" bit. Accordingly, in double precision format, the mantissa bit field actually constitutes 53 bits with the leading one "hidden", while in single precision format, the mantissa bit field actually constitutes 24 bits with the leading one "hidden".

Due to IEEE standards requiring normalization of a mantissa, floating point numbers rarely have equal exponents. Accordingly, when floating point units add or subtract a second operand represented in floating point notation with a first operand represented in floating point notation, the mantissa of the second operand typically must be shifted because an addition or subtraction cannot be performed until the exponent of the second operand equals the exponent of the first operand. The floating point units equalize the first and second exponents by shifting the mantissa of the second operand relative to the mantissa of the first operand. Shifting the second mantissa to the right increases its exponent one for each shift, while shifting the second mantissa to the left decreases its exponent one for each shift.

Floating point units typically include a comparator and alignment shifter for shifting the second mantissa such that the second exponent equals the first exponent. The comparator compares the values of the first and second exponents to determine the number of shifts the second mantissa requires to equalize the first and second exponents. After determining an alignment shift value, the comparator controls the alignment shifter in accordance with the alignment shift value to shift the second mantissa relative to the first mantissa.

The alignment shifter includes a bit field greater than the bit field for the first mantissa in order to accommodate any bits of the second mantissa not aligned with the bits of the first mantissa. The first and second mantissas will not align whenever there exists a difference in magnitude between the first and second exponent. Specifically, if the second exponent exceeds the first exponent, at least one bit of the second mantissa will reside within the alignment shifter in a bit positions left of the most significant bit of the first mantissa (hereinafter referred to as second path bits). Conversely, if the second exponent is less than the first exponent, at least one bit of the second mantissa will reside in bit positions to the right of the least significant bit of the first mantissa (hereinafter referred to as sticky bits).

Floating point units include an adder that performs the desired operation (i.e., addition or subtraction) on the first mantissa and any bits of the second mantissa residing in bit positions aligned with the bits of the first mantissa to produce an intermediate result. The output from the adder forms an intermediate result because the final result of the operation must be modified if the shifting of the second mantissa created second path bits. If second path bits exist, the intermediate result must be modified by placing the least significant bit of the second path bits in the bit position to the left of the most significant bit of the intermediate result so that the final result reflects all the bits of the second mantissa.

Floating point units include a normalize shifter that normalizes the final result by shifting the leading one of the final result until it resides to the left of the most significant bit of the normalize shifter. However, before the normalize shifter can normalize the final result, a normalize shift value must be calculated from the position of the leading one within the second path bits. Consequently, floating point units include a leading ones detector (LOD) that inputs the second path bits, determines the position of the leading one, and calculates the normalize shift value required to control the normalize shifter.

Floating point units include an adjust circuit that will supply the final sign, exponent and mantissa required for IEEE correct results.

If the first exponent exceeds the second exponent, sticky bits rather than second path bits exist. Consequently, the intermediate result output from the adder does not require modification and, thus, forms the final result. A leading ones detector (LOD) similar to the LOD described above determines the leading one within the intermediate result and calculates a normalize shift value accordingly. Normalize shifter normalizes the unmodified final result and then outputs a normalized final result to the adjust circuit.

The adjust circuit rounds off the final result utilizing the sticky bits. Accordingly, floating point units include a sticky bit detector that detects sticky bits and then outputs them to the adjust circuit.

A sticky bit detector typically detects each shift performed by the alignment shifter and then compares the actual number of shifts performed with the number of reference shifts required to place the least significant bit of the second mantissa aligned with the least significant bit of the first mantissa. If the number of actual shifts exceeds the number of reference shifts, then sticky bits exist, and the difference between the actual number of shifts and the reference shifts indicates the number of sticky bits.

After detecting the sticky bits, the sticky bit detector outputs the sticky bits to the adjust circuit. The adjust circuit inputs the sticky bits and utilizes the sticky bit or bits to form the final answer. Finally, the adjust circuit associates the proper exponent and sign with the final mantissa and outputs the final mantissa, sign, and exponent as the final answer.

Although the above sticky bit detector and LOD for second path bits operate adequately, their implementation in separate circuitry unnecessarily increases the size of floating point units. Furthermore, the utilization of separate circuitry increases the number of steps a floating point unit must perform during an operation which slows the operating speed of the floating point unit. Additional steps slow the operating speed of the floating point unit because each additional step requires at least one separate clock cycle. Accordingly, because floating point units iteratively perform multiple operations, separately detecting sticky bits and a leading one in the second path bits significantly increases the time required to complete a series of operations.

A consequence of the slowed operating speed beyond simple inefficiency is that floating point units implemented with the separate circuitry cannot be utilized with high speed circuitry. For example, circuitry operating at high frequencies would require a result from a floating point unit at a time before an operation has been finished. That is, the additional clock cycles required to perform both detection steps slow the floating point unit to a level where it cannot perform arithmetic operations quickly enough to satisfy the demands of high speed circuitry.

Accordingly, circuitry that eliminates the separate detection of sticky bits and second path bits would reduce the amount of hardware and increase the speed of any floating point unit so that it could be utilized with high speed circuitry.

SUMMARY OF THE INVENTION

An apparatus for detecting sticky and a leading one includes first circuitry capable of detecting both sticky and a leading one. The apparatus further includes second circuitry that determines whether a sticky or a leading one detect is required. Depending upon that determination, the second circuitry controls the first circuitry to perform a sticky detection or a leading one detection. A method practiced by the apparatus includes the steps of detecting either sticky or a leading one utilizing the same circuitry, determining whether a sticky or a leading one detect is required, and controlling the circuitry in accordance with the determination of whether a sticky or a leading one detect is required.

DETAILED DESCRIPTION OF THE PREFERRED EMBODIMENT

Figure 1:
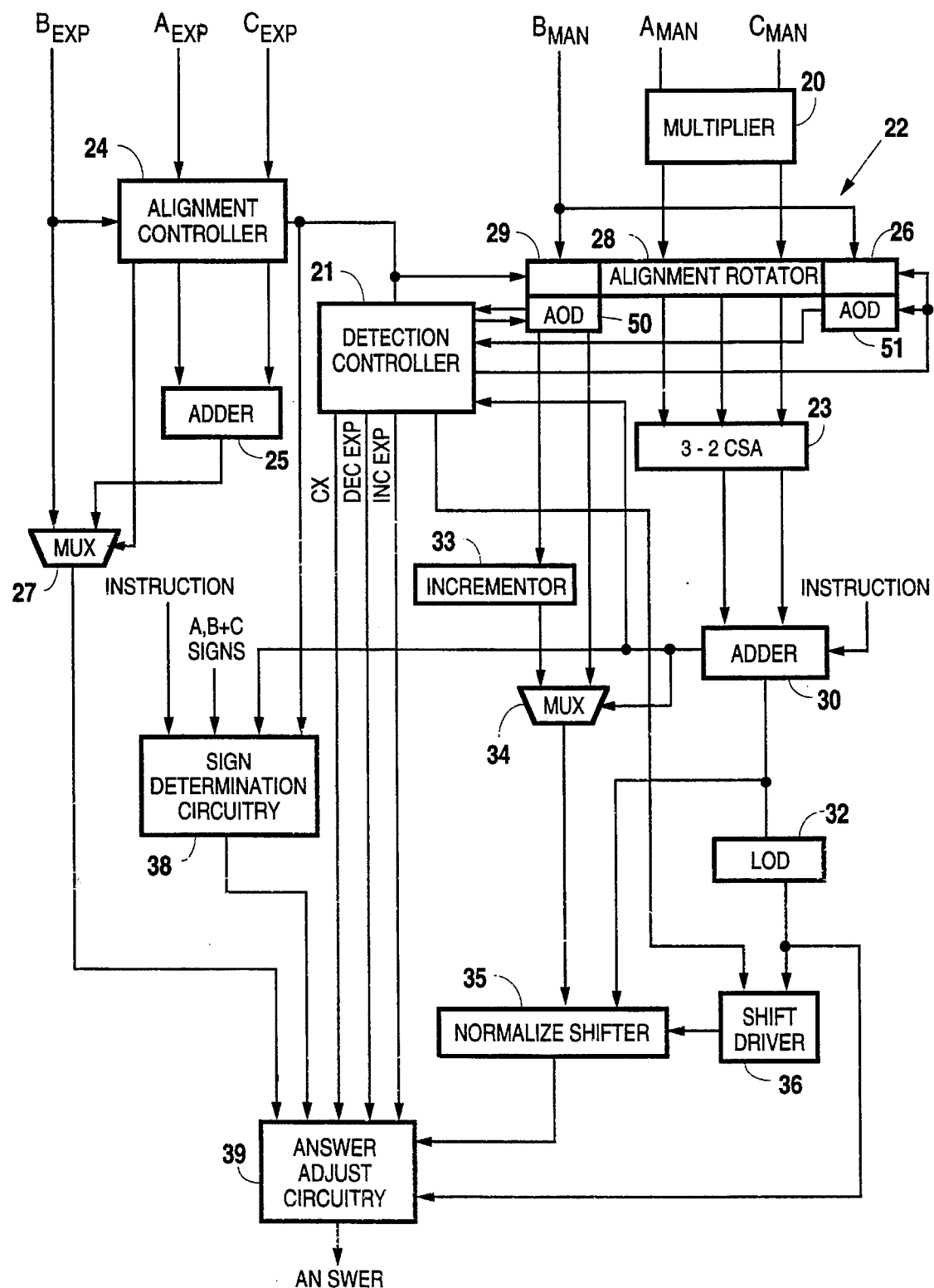
FIG. 1 is a block diagram illustrating an example execution flow of a floating point unit implementing the sticky and leading one detection circuitry of the preferred embodiment.

FIG. 1 illustrates an execution flow 5 of a floating point unit which includes the sticky and leading one detection circuitry according to this preferred embodiment. In FIG. 1 although all information paths are shown with a single line, each information path transfers multiple bits of information. Likewise, the components of flow 5 operate in response to multiple bits of information unless otherwise specified.

The following description of flow 5 and the implementation of the sticky and leading one detection circuitry therein is for the purpose of disclosure and to aid in the understanding of the invention. Those skilled in the art will recognize that the sticky and leading one detection circuitry may be implemented in any execution flow of a floating point unit.

Flow 5 performs a multiplication between an A and a C operand followed by the addition of a B operand to or the subtraction of a B operand from the result of the multiplication between the A and C operands. Flow 5 performs the above arithmetic operations to provide a floating point unit with the capability of executing a variety of other arithmetic operations. Illustratively, many arithmetic operations such as division or square root may be executed as a series of subtractions, multiplications, and additions. Particularly, division between two operands may be approximated by a Taylor series expansion formulated by iteratively executing a series of subtractions, multiplications, and additions.

Any floating point unit implementing flow 5 includes a controller (not shown) that outputs to flow 5 an instruction (e.g., add or subtract) and the operands required to execute the instruction. After executing the instruction, the floating point unit controller directs flow 5 to output the answer to an answer register (not shown). If the instruction is one in a series of instructions to approximate an arithmetic operation (e.g., division or square root) the answer output from flow 5 is an intermediate answer re-input into flow 5 by the floating point unit controller as an operand for a following instruction of the instruction series. At the end of the instruction series, the floating point unit controller directs flow 5 to output the answer to the answer register.

Flow 5 includes multiplier 20 which is a Booth encoded Wallace tree multiply array. Multiplier 20 does not require the input of an instruction from the floating point controller. Once multiplier 20 receives the mantissa of an A operand (hereinafter referred to as the A mantissa) and the mantissa of a C operand (hereinafter referred to as the C mantissa), it inputs the A and C mantissas and multiplies them to produce a carry and sum that it outputs separately to 3-2 carry-save-add (CSA) 23. If only addition is required of flow 5, the floating point unit controller outputs a C operand equaling one so that multiplier 20 outputs the A mantissa to 3-2 CSA 23.

Flow 5 includes alignment controller 24 to control the addition of a B operand to or the subtraction of a B operand from the product of the A operand and C operand. Alignment controller 24 develops control signals necessary to add or subtract the B operand by determining whether the exponent of the B operand (hereinafter referred to as the B exponent) is greater than or equal to the exponent of the product between the A operand and C operand (hereinafter referred to as the AC exponent). Alignment control 24 inputs the A exponent and C exponent and adds those exponents together to determine the value of the AC exponent. After determining the AC exponent, alignment controller 24 inputs the B exponent and compares the B exponent with the AC exponent to determine whether the B exponent is greater than or equal to the AC exponent. Alignment controller 24 controls alignment rotator 22, multiplexer 27, and leading one detect (LOD) 32 and furnishes input for detection controller 21 and sign determination circuitry 38 in accordance with its determination of whether the B exponent exceeds or equals the AC exponent.

Flow 5 includes alignment rotator 22 to store and shift the mantissa of the B operand (hereinafter referred to as the B mantissa) so that the B mantissa may be added to or subtracted from the result of the multiplication between the A mantissa and C mantissa (hereinafter referred to as the AC result). The B mantissa must be shifted because flow 5 cannot perform an addition or subtraction between the B mantissa and the AC result unless the B exponent equals the AC exponent. Accordingly, in determining whether the B exponent is greater than or equal to the AC exponent, alignment controller 24 also calculates the exact difference in magnitude between the B exponent and the AC exponent. That difference in magnitude corresponds to a shift value (i.e., the number of shifts) required to align the B mantissa with the AC result such that the B exponent equals the AC exponent.

In this preferred embodiment, alignment rotator 22 is a three stage shifter that includes a total of 175 bits. Furthermore, alignment rotator 22 is separated into B-path bit field 29, MADDRANGE (multiplication-add) bit field 28, and a wraparound bit field 26. MADDRANGE bit field 28 includes a number of bits equal to the maximum number of bits resulting from a multiplication between an A mantissa and a C mantissa format. Thus, MADDRANGE bit field 28 includes 106 bits. B-path bit field 29 includes 54 bits, while wraparound bit field 26 includes 15 bits. Additionally, the least significant bit of alignment rotator 22 is connected to its most significant bit so that any bits shifted beyond the least significant bit will rotate back into B-path bit field 29 from wraparound bit field 26 (see FIG. 2).

Alignment rotator 22 inputs the B mantissa with the most significant bit of the B mantissa aligned with its most significant bit to provide alignment controller 24 with a reference that allows the correct shifting of the B mantissa in accordance with the alignment shift value. Consequently, the B mantissa resides within B-path bit field 29 prior to shifting. Additionally, when the B exponent exceeds the AC exponent, detection controller 21 controls wraparound bit field 26 to input the 15 bits to the right of the "hidden" bit of the B mantissa (described herein).

Figure 2:
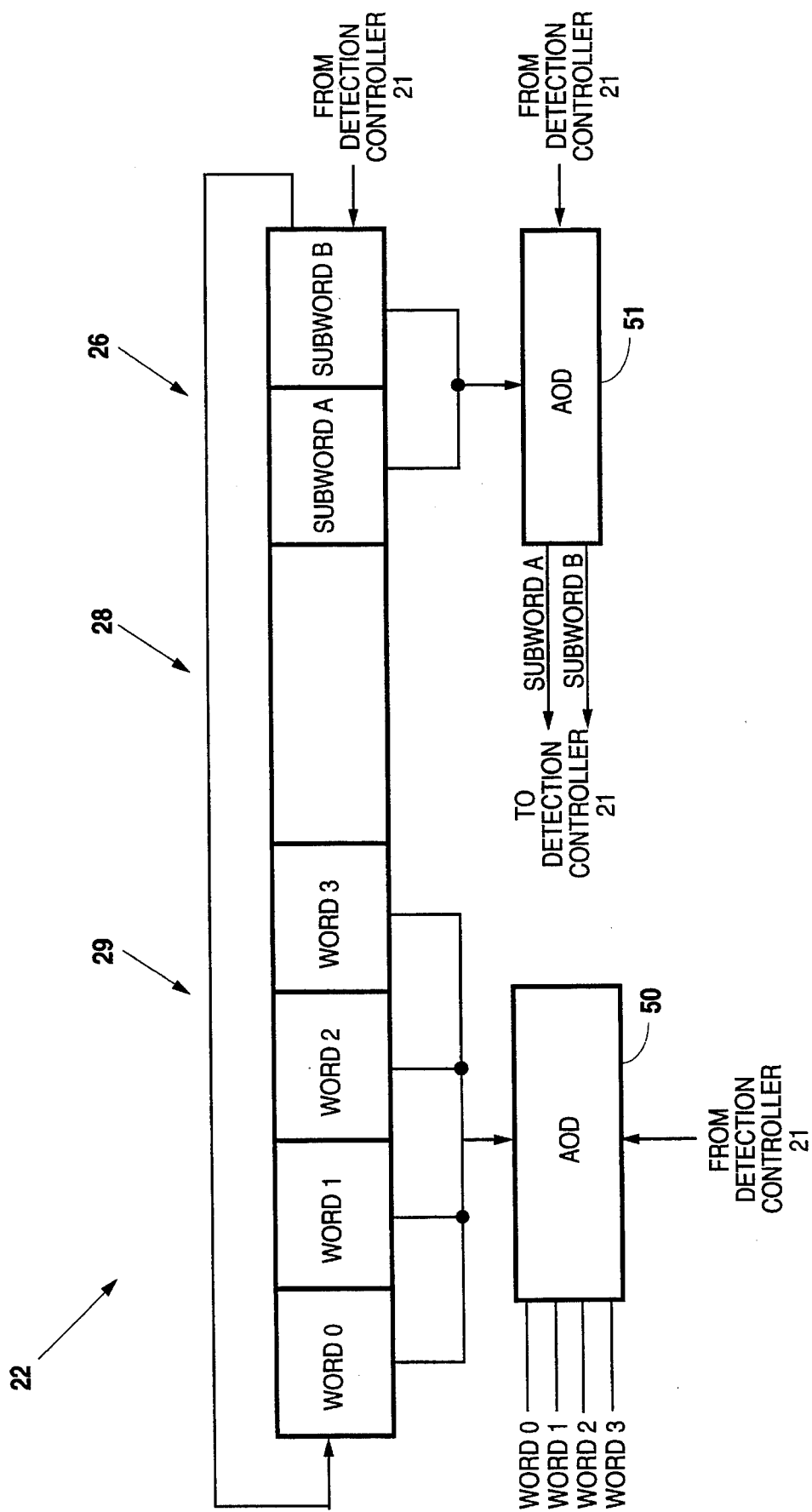
FIG. 2 is a block diagram illustrating the sticky and leading one detection circuitry of the preferred embodiment.

As illustrated in FIG. 2, B-path bit field 29 is separated into four words, words_0-3. Each of words_0-2 includes sixteen bits, while word_3 includes seven bits. Similarly, wraparound bit field 26 is divided into subword_A that includes seven bits and subword_B that includes eight bits.

Referring again to FIG. 1, after determining an alignment shift value, alignment controller 24 controls alignment rotator 22 to shift the B mantissa from 0 to a maximum of 161 bits in accordance with the alignment shift value. That is, when the B exponent has a magnitude of at least 1 greater than the AC exponent, the alignment shift value is from 0 to 54 so that the B mantissa resides either completely within B-path bit field 29 or at least partially within B-path bit field 29 with the remaining bit(s) of the B mantissa residing in MADDRANGE bit field 28. If the B exponent equals the AC exponent or is no more than 67 less than the AC exponent, the alignment shift value is from 55 to 122 so that the B mantissa resides either completely within MADDRANGE bit field 28 or at least partially within MADDRANGE bit field 29 with the remaining bits of the B mantissa residing in wraparound bit field 26. When the B exponent is at least 68 less than the AC exponent but no more than 106, the alignment shift value is from 123 to 160 so that the B mantissa resides at least partially within MADDRANGE bit field 29 and wraparound bit field 26 with the remaining bits of the B mantissa having been rotated back into B-path bit field 29. Finally, if the B exponent is at least 107 less than the AC exponent, the alignment shift value is 161 so that the most significant 15 bits of the B mantissa reside within wraparound bit field 26 and the remaining bits of the B mantissa have been rotated back into B-path bit field 29. Any bit(s) of the B mantissa remaining in B-path bit field 29 will hereinafter be referred to as B-path bit(s), while any bit(s) of the B mantissa residing in MADDRANGE bit field 28 will hereinafter be referred to as the MADDRANGE bit(s). Likewise, any bit(s) of the B mantissa that reside in wraparound bit field 26 or shift through wraparound bit field 26 to rotate back into B-path bit field 26 will hereinafter be referred to as sticky bit(s).

Flow 5 includes adder 25 to input the A exponent and C exponent and add those exponents together to produce the AC exponent. Flow 5 includes multiplexer 27 to permit the selection of either the B exponent or the AC exponent for output to answer adjust circuitry 39 to supply the appropriate exponent for the answer. Alignment controller 24 connects to multiplexer 27 via select lines that allow alignment controller 24 to activate multiplexer 27 to pass either the B exponent or the AC exponent calculated by adder 25. If alignment controller 24 determines the B exponent is greater than or equal to the AC exponent then it triggers multiplexer 27 to output the B exponent to answer adjust circuitry 39. Alternatively, if the B exponent is less than the AC exponent, alignment controller 24 triggers multiplexer 27 to output the AC exponent to answer adjust circuitry 39.

Flow 5 includes 3-2 carry-save-add (CSA) 23 to input the carry and sum output from multiplier 20 and the MADDRANGE bits, if any exist, and compress those three inputs into a carry and sum output to adder 30 (described herein). If only multiplication is required of flow 5, the B operand is set to 0 so that 3-2 CSA 23 outputs only the carry and sum of the AC result to adder 30. Furthermore, if the B mantissa resides either completely within B-path bit field 29 or within both wraparound bit field 26 and B-path bit field 29 as sticky bits, 3-2 CSA 23 outputs only the carry and sum of the AC result to adder 30. Flow 5 includes adder 30 to perform the final addition of the carry and sum output from the 3-2 CSA. When adder 30 produces a carry during the performance of either an add or subtract, it outputs a carry signal to detection controller 21, multiplexer 34, and sign determination circuitry 38 (described herein).

The sticky and leading one detection circuitry includes detection controller 21, any ones detect (AOD) 50, and any ones detect (AOD) 51 to detect either the leading 1 (i.e., the "hidden" bit) within the B-path bits or the sticky bits. The sticky and leading one detect circuitry detects either a leading 1 within the B-path bits or the sticky bits because B-path bits and sticky bits do not exist simultaneously. That is, if the B exponent exceeds the AC exponent, B-path bits exist whereas, if the B exponent is less than the AC exponent by a specific magnitude (68 in this preferred embodiment), sticky bits exist in wraparound bit field 26 and possibly B-path bit field 29.

For the detection of the leading 1 (i.e., the B exponent exceeds the AC exponent), detection controller 21 inputs the alignment shift value calculated in alignment controller 24. The alignment shift value indicates to detection controller 21 which bit within B-path bit field 29 the leading 1 resides because the alignment shift value equals the number of bit positions the leading 1 was shifted during the equalization of the B exponent and AC exponent. Accordingly, detection controller 21 ascertains the bit position of the leading 1 merely by inputting the alignment shift value from alignment controller 24.

Detection controller 21 inputs the alignment shift value to furnish shift driver 36 (described herein) with the normalize shift value necessary to normalize the result for the operation of an A mantissa times a C mantissa plus or minus a B mantissa (hereinafter referred to as the ACB result). The alignment shift value may be utilized as the normalize shift value because they are equal. That is, the alignment shift value causes a shift of the leading 1 to the right until the B exponent equals the AC exponent, whereas the normalize shift value causes a shift of the ACB result to the left until the result exponent equals the B exponent.

However, there are instances when and addition performed by adder 30 results in the bit position of the leading 1 increasing by one. If that occurs, the B exponent will be one less than that required by the ACB result when the ACB result is normalized using the alignment shift value as the normalize shift value. Accordingly, detection controller 21 must detect when the bit position of the leading 1 will increase so that it can output an exponent increment signal to answer adjust circuitry 44 which increments the B exponent accordingly.

Similarly, there are instances when a subtraction performed by adder 30 results in the bit position of the leading 1 decreasing by one. If that occurs, the B exponent will be one more than that required by the ACB result when the ACB result is normalized using the alignment shift value as the normalize shift value. Accordingly, detection controller 21 must detect when the bit position of leading 1 will decrease so that it can output an exponent decrement signal to answer adjust circuitry 44 which decrements the B exponent accordingly.

To determine whether the B exponent must be incremented or decremented, detection controller 21 inputs the instruction and the carry signal output from adder 30 along with the alignment shift value. If the instruction is an add, detection controller 21 must determine whether a carry produced by the addition within adder 30 will propagate through the B-path bits to the leading 1, causing the position of the leading 1 to increase by one bit. Detection controller 21 begins detection for an add instruction by outputting a control signal that directs AOD 50 to sequentially input words_0-3, complement each input word, and perform any ones detect. Specifically, AOD 50 inputs word_0, complements each bit of word_0, and then OR's the complemented bits to determine if there is a 1. AOD 50 outputs to detection controller 21 the word_0 bit which is the OR of the complimented bits. AOD 50 then inputs the bits within word_1, compliments those bits, OR's the complimented bits, and outputs the word_1 bit to detection controller 21. Likewise, AOD 50 inputs the bits within word_2, compliments those bits, OR's the complimented bits, and outputs the word_2 bit to detection controller 21. Finally, AOD 50 inputs the bits within word_3, compliments those bits, OR's the complimented bits, and outputs the word_3 bit to detection controller 21.

Detection controller 21 inputs the word_0-3 bits and OR's those bits to determine whether a carry produced in adder 30 will shift the position of the leading 1. If the OR performed within detection controller 21 produces a 1, then a carry from adder 30 will not increase the bit position of the leading 1. Conversely, if the OR within controller 21 produces a 0, then a carry produced within adder 30 will increase the bit position of the leading 1. Consequently, if the addition within adder 30 produced a carry, detection controller 21 outputs the increment exponent signal to answer adjust circuitry 39.

AOD 50 compliments the bits within each of words_0-3 and performs any ones detect because that not only provides an indication of whether a carry signal will change the position of the leading one, but it also allows AOD 50 to detect sticky bits (described herein). With respect to an increase in the bit position of the leading 1, if the B-path bits include a 0, a carry produced during the addition performed by adder 30 will not increase the bit position of the leading 1. Thus, when AOD 50 detects a one in the complimented bits, it means that a 0 exists in the B-path bits so that the bit position of the leading 1 will not change. However, if the B-path bits are all ones, then the complimented B-path bits will not contain a 1. Thus, when detection controller 21 determines that the complimented B-path bits are all zeros and there is a carry from adder 30, the bit position of the leading one will increase because the carry added into the B-path bits will propagate to the leading 1, causing it to increase its bit position by one.

Conversely, when the instruction is a subtract and adder 30 produces a carry signal, detection controller 21 must determine whether the borrow produced by the subtraction will propagate through the B-path bits to the leading 1, causing the position of the leading 1 to decrease by one bit. If the instruction performed by adder 30 is a subtract, detection controller 21 outputs a control signal to wraparound bit field 26 that directs wraparound bit field 26 to input the 15 bits of the B mantissa residing to the right of the leading 1. Once the 15 bits to the right of the leading 1 have been input into wraparound bit field 29, detection controller 21 outputs a control signal that directs AOD 51 to input subword_A. AOD 51 OR's the seven bits of subword A to produce a subword_A bit. After producing the subword_A bit, AOD 51 inputs the eight bits of subword_B and OR's those bits to produce a subword_B bit.

The fifteen bits to the right of the leading 1 were input into wraparound bit field 26 and OR'ed to produce a subword_A bit and a subword_B bit that does not reflect the leading 1. The leading 1 was eliminated because detection controller 21 cannot determine whether a borrow will propagate to the leading 1 when the leading 1 remains.

After AOD 51 develops the subword_A bit and the subword_B bit, detection controller 21 outputs a control signal that directs AOD 50 to sequentially input words_0-3 to determine if there are any ones. AOD 50 sequentially inputs words_0-3 and OR's the bits of each word to produce a word_0, word_1, word_2, and word_3 bit. However, detection controller 21 does not input the word bit of the particular word within B-path bit field 29 containing the leading 1. Instead, detection controller 21 substitutes the subword_A bit and possibly the subword_B bit for the word bit of the word containing the leading 1.

Detection controller 21 recognizes which of words_0-3 contains the leading 1 from the alignment shift value calculated by alignment controller 24. Accordingly, if any of words_0-2 contains the leading 1, detection controller 21 substitutes both the subword_A bit and the subword_B bit for the word bit corresponding to the word containing the leading 1. If the leading 1 resides within word_3, detection controller 21 substitutes the subword_A bit for the word_3 bit because word_3 contains only seven bits and could therefore only contain bits corresponding to the bits contained within subword_A.

Detection controller 21 inputs the subword_A bit and possibly the subword_B bit and the three word bits of the words not including the leading 1 and OR's those bits to determine if the B-path bits contain a 1 other than the leading 1. If the OR of the word and subword bits produces a one, the bit position of the leading 1 will not decrease regardless of the whether the subtraction performed by adder 30 generates a carry signal. Conversely, if the OR of the word and subword bits furnishes a 0, then a carry produced by the subtraction performed by adder 30 will decrease the bit position of the leading 1. Consequently, detection controller 21 outputs the exponent decrement signal to answer adjust circuitry 39. Thus, by eliminating the leading 1 and searching for any other 1's, detection controller 21 determines whether a borrow will affect the leading 1.

If the alignment shift value input by detection circuitry 21 indicates that the B exponent is less than the AC exponent by a magnitude large enough for bits of the B mantissa to shift into wraparound bit field 26 and possibly into B-path bit field 29, detection controller 21 performs sticky detection. For sticky detection, detection controller 21 outputs a control signal that controls AOD 51 to input the sticky bits within subword_A and OR those sticky bits to produce a subword_A sticky bit. AOD 51 then inputs the sticky bits in subword B, and OR's those sticky bits to produce a subword_B sticky bit.

Likewise, detection controller 21 controls AOD 50 to sequentially input the words_0-3 and OR those sequentially input bits to form a word_0 sticky bit, a word_1 sticky bit, a word_2 sticky bit, and a word_3 sticky bit. Detection controller 21 inputs the subword_A sticky bit, the subword_B sticky bit, and each of the word_0-3 sticky bits and OR's those sticky bits to produce a calculated sticky bit CX that it outputs to answer adjust circuitry 39. Answer adjust circuitry 39 utilizes the calculated sticky bit CX in accordance with the IEEE 754-1985 rounding rules to determine the proper rounding of the answer mantissa.

Although alignment rotator 22 has been described in this preferred embodiment as including wraparound bit field 22, those skilled in the art will recognize that wraparound bit field is not required for sticky bit detection. That is, any sticky bits may be shifted directly from MADRANGE bit field 28 into B-path bit field 29. In that instance, AOD 50 would detect all sticky bits, thus eliminating the necessity of AOD 51. However, if wraparound bit field 26 and AOD 51 are eliminated, other circuitry would need to be implemented within flow 5 to perform the elimination of the leading 1 through inputting of the fifteen bits to the right of the leading 1.

Flow 5 includes sign determination circuitry 38 to ascertain the sign of the answer output from flow 5. Sign determination circuitry 38 inputs from the floating point unit controller the instruction and the sign signal indicating the result of the comparison between the B exponent and the AC exponent. Sign determination circuitry 38 further inputs a carry signal from adder 30 and the A, B, and C signs input into flow 5 by the floating point unit controller.

If alignment controller 24 determines the B exponent is greater than the AC exponent, then sign determination circuitry 38 utilizes the B sign as the sign for the answer. That is, if the instruction is add and the B sign is positive or the instruction is subtract and the B sign is negative, sign determination circuitry 38 sets the answer sign to positive. Alternatively, if the instruction is add and the B sign is negative or the instruction is subtract and the B sign is positive, sign determination circuitry 38 sets the answer sign to negative.

Conversely, if alignment control 24 determines the AC exponent is greater than the B exponent, then sign determination circuitry 38 examines the A sign and C sign to establish the sign for the answer. That is, when both the A and C signs (hereinafter referred to as the AC sign) are positive or negative, sign determination circuitry 38 sets the answer sign to positive. Alternatively, when the AC sign is negative, sign determination circuitry 38 sets the answer sign to negative.

Finally, when alignment controller 24 determines the B exponent equals the AC exponent, sign determination circuitry 38 sets the answer sign to positive when the AC and B signs are positive and the instruction is an add instruction or the AC sign is positive and the B sign is negative and the instruction is a subtract instruction. Similarly, sign determination circuitry 38 sets the answer sign to negative when the AC and B signs are negative and the instruction is an add instruction or the AC sign is negative and the B sign is positive and the instruction is a subtract instruction.

For the remaining cases when the B exponent equals the AC exponent, sign determination circuitry 38 requires the carry signal output from adder 30 to determine the sign of the answer. If adder 30 produces a carry during, then sign determination circuitry 38 establishes the sign for the answer as positive, while, if no carry is produced, sign determination circuitry 38 establishes the sign for the answer as negative. After determining the answer sign, sign determination circuitry 38 outputs the sign to answer adjust circuitry 44.

Flow 5 includes multiplexer 34, normalize shifter 35, and incrementor 33 to perform any necessary modification of the output from adder 30. After adder 30 completes the addition of either the carry and sum, normalize shifter 35 inputs the output of adder 30 with the least significant bit of the output from adder 30 aligned with its least significant bit. If B-path bit field 29 contains no B-path bits because the AC exponent exceeded or equaled the B exponent, then the output from adder 30 forms the result for the operation of A*C+B (hereinafter referred to as the ACB result).

However, if B-path bit field 29 contains B-path bits because the B exponent is greater than the AC exponent, then the output from adder 30 must be modified before it forms the ACB result. Incrementor 33 increments the B-path bits to provide for the situation where an add instruction performed by adder 30 produces a carry. Multiplexer 34 permits the selection between incremented B-path bits and unincremented B-path bits. If the instruction within adder 30 results in a carry, adder 30 outputs a carry signal to multiplexer 34 triggering multiplexer 34 to output the incremented B-path bits to normalize shifter 35. Alternatively, if the addition within adder 30 produces no carry, adder 30 outputs a carry signal that triggers multiplexer 34 to output the unincremented B-path bits to normalize shifter 35.

The inputting of either the incremented or unincremented B-path bits into normalize shifter 35 modifies the output from adder 30 because normalize shifter 35 inputs the B-path bits with the least significant bit of the B-path bits residing in the bit place directly to the left of the most significant bit output from adder 30. Consequently, the B-path bits and the output from adder 30 are concatenated to form an ACB result that reflects the greater magnitude of the B exponent than the AC exponent. Conversely, if the AC exponent is larger than or equal to the B exponent, no B-path bits will exist, resulting in the output from adder 30 forming the ACB result.

Flow 5 includes normalize shifter 35 and shift driver 36 to accomplish the IEEE 754-1985 required normalization of the ACB result contained within normalize shifter 35. Flow 5 also includes leading ones detect (LOD) 32 to furnish shift driver 36 with a normalize shift value when the AC exponent exceeds or equals the B exponent. Alignment controller 24 controls LOD 32 in accordance with its determination of whether the B exponent is greater than or equal to the AC exponent. If alignment controller 24 determines the B exponent is less than or equal to the AC exponent, then there will be no B-path bits and the output of adder 30 will form the complete ACB result. Consequently, alignment controller 24 enables LOD 32. Once enabled, LOD 32 detects the bit position of the leading one within the output from adder 30 and determines the shift value (i.e, the number of shifts) required to normalize the ACB result. Alternatively, when alignment controller 24 determines the B exponent is greater than the AC exponent, detection controller 21 furnishes shift driver 36 with the normalize shift value because the output of adder 30 must be modified with the B-path bits.

When the B exponent is less than or equal to the AC exponent, the addition or subtraction performed by adder 30 might result in an ACB result that requires an exponent having a value either one greater or one less than the value of the exponent outputted to answer adjust circuitry 39 by multiplexer 27. As previously described, if the B exponent is equal to the AC exponent, multiplexer 27 outputs the B exponent, but, if the AC exponent exceeds the B exponent, multiplexer 27 outputs the AC exponent. However, unlike detection controller 21, LOD 32 cannot use the shift value calculated by alignment controller 24 to determine if an exponent adjustment is required because that shift value does not provide a usable reference point when the AC exponent exceeds or equals the B exponent.

Consequently, answer adjust circuitry 39 includes a converter that inputs the shift value determined by LOD 32 and converts the shift value to a corresponding exponent offset. Answer adjust circuit further includes a comparator that compares the B or AC exponent output from multiplexer 27 to the shift value exponent. If the comparator determines the B or AC exponent differs from the shift value exponent, then the B or AC exponent must be either increased or decreased. If B-Path bits exist then detector 21 indicates the adjust. If B-Path bits do not exist then the final exponent is adjusted by the offset.

Once the normalize shift value has been determined, the appropriate one of detection controller 21 and LOD 32 outputs the normalize shift value to shift driver 36. Shift driver 36 inputs the normalize shift value and controls normalize shifter 35 to shift the ACB result contained therein until the leading one of the ACB result in the most significant bit of normalize shifter 35 as required under the IEEE 754-1985 standard.

After the normalization of the ACB result, answer adjust circuitry 39 adjusts the final answer to conform to an IEEE 754-1985 standard. As previously described, answer adjust circuitry 39 increments or decrements the exponent of the final answer, if required, in response to the shift value of LOD 32 or the exponent increment or decrement signals output from detection controller 21 when detection controller 21 is in its leading one detect mode. Furthermore, answer adjust circuitry 39 includes a rounding circuit that rounds the ACB result using an IEEE 754-1985 rounding standard. If detection controller 21 was in its sticky detect mode and, therefore, output a calculated sticky bit, the rounding circuit inputs the calculated sticky bit to aid in the rounding determination. The specifics of the rounding circuit will not be described because those of skilled in the art will understand the standard circuitry required to implement the IEEE 754-1985 rounding standard. After answer adjust circuitry 39 rounds the ACB result to form a mantissa and adjusts the exponent when necessary, answer adjust circuitry associates the exponent and sign with the mantissa to furnish a final answer.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not limited in any respect by the foregoing description, rather, it is defined only by the claims that follow.

We claim:

1. An apparatus for detecting sticky and a leading one of a first operand input into an execution flow that performs arithmetic operations between the first operand and a second operand input into the execution flow, the execution flow comprising arithmetic circuitry for performing arithmetic operations on the first and second operands and comparison circuitry for furnishing an output representing the comparison of the exponent of the first operand with the exponent of the second operand, comprising:

circuitry, responsive to the of the comparison circuitry, for detecting both sticky and a leading one;

said circuitry detecting the position of the leading one utilizing the output of the comparison circuitry when that output indicates the exponent of the first operand exceeds the exponent of the second operand; and said circuitry inputting selected bit fields of the first operand to detect sticky when the output of the comparison circuitry indicates that the exponent of the first operand is less than the exponent of the second operand.

2. The apparatus according to claim 1 wherein said circuitry furnishes a normalize shift value to the arithmetic circuitry when the exponent of the first operand exceeds the exponent of the second operand.

3. The apparatus according to claim 1 wherein the arithmetic circuitry comprises an alignment rotator for aligning the first operand relative to the second operand.

4. The apparatus according to claim 3 wherein the alignment rotator comprises a first bit field, a second bit field, and a third bit field wherein said first and third bit fields are coupled together.

5. The apparatus according to claim 4 wherein said circuitry comprises a first ones detect coupled to said first bit field.

6. The apparatus according to claim 5 wherein said circuitry comprises a second ones detect coupled to said third bit field.

7. The apparatus according to claim 6 wherein said circuitry comprises a detection controller for controlling said first and second ones detect in response to the output of the comparison circuitry.

8. The apparatus according to claim 7 wherein, when the output of the comparison circuitry indicates the exponent of the first operand is less than the exponent of the second operand, said detection controller directs said first ones detect to examine said first bit field and said second ones detect to examine said third bit field to determine if either bit field contains a one.

9. The apparatus according to claim 8 wherein said detection controller inputs the determinations of said first ones detect and said second ones detect to develop a sticky bit.

10. The apparatus according to claim 7 wherein the arithmetic circuitry comprises an adder that adds or subtracts the first operand and the second operand.

11. The apparatus according to claim 10 wherein, when the output of the comparison circuitry indicates the exponent of the first operand exceeds the exponent of the second operand and the adder adds the first and second operands, said detection controller directs said first ones detect to input and complement any bits within said first bit field and examine the complemented bits to determine if there is a one.

12. The apparatus according to claim 11 wherein said detection controller inputs the determination of said first ones detect and a carry signal from the adder to determine if an exponent increment is necessary.

13. The apparatus according to claim 10 wherein said first bit field includes first, second, third, and fourth words.

14. The apparatus according to claim 13 wherein, when the output of the comparison circuitry indicates the exponent of the first operand exceeds the exponent of the second operand and the adder subtracts the first operand from the second operand, said detection controller directs the alignment rotator to input into said third bit field a predetermined number of bits of the first operand minus the leading one.

15. The apparatus according to claim 14 wherein said detection controller directs said second ones detect to examine the bits within said third bit field to determine if there is a one.

16. The apparatus according to claim 15 wherein said detection controller directs said first ones detect to sequentially examine said first, second, third, and fourth words to determine if there is a one.

17. The apparatus according to claim 16 wherein said detection controller inputs a carry signal from the adder, the determinations of said first ones detect except for the word including the leading one, and the determination of said second ones detect substituted in the place of the word including the leading one to determine if an exponent decrement is necessary.

18. A method for detecting sticky and a leading one of a first operand input into an execution flow that performs arithmetic operations between the first operand and a second operand input into the execution flow, the execution flow comprising arithmetic circuitry for performing arithmetic operations on the first and second operand and comparison circuitry for furnishing an output representing the comparison of the exponent of the first operand with the exponent of the second operand, comprising the steps of:

inputting the output from the comparison circuitry into circuitry for detecting both sticky and a leading one;

detecting the position of the leading one utilizing said circuitry and the output of the comparison circuitry when that output indicates the exponent of the first operand exceeds the exponent of the second operand; and inputting by said circuitry selected bit fields of the first operand to detect sticky when the output of the comparison circuitry indicates that the exponent of the first operand is less than the exponent of the second operand.

19. The method according to claim 18 further comprising the step of furnishing a normalize shift value from said circuitry to the arithmetic circuitry when the exponent of the first operand exceeds the exponent of the second operand.

20. The method according to claim 18 wherein the step of inputting the output of the comparison circuitry includes the step of determining from that output utilizing a detection controller whether a sticky detect or a leading one detect is required.

21. The method according to claim 20 further comprising the step of the controlling an alignment rotator of the arithmetic circuitry including first, second, and third bit fields to align the first operand relative to the second operand.

22. The method according to claim 21 wherein, in the step of controlling the alignment rotator, bits of the first operand shifted beyond the third bit field rotate into the first bit field.

23. The method according to claim 22 further comprising the step of, when the exponent of the first operand is less than the exponent of the second operand, controlling a first ones detect with said detection controller to examine said first bit field and a second ones detect with said detection controller to examine said second bit field to determine if either bit field includes a one.

24. The method according to claim 23 further comprising the step of developing a sticky bit in accordance with the determinations of said first ones detect and said second ones detect utilizing said detection controller.

25. The method according to claim 21 further comprising the step of, when the exponent of the first operand exceeds the exponent of the second operand and an adder of the arithmetic circuitry adds the first and second operands, controlling a first ones detect with said detection controller to complement any bits within said first bit field and examine the complemented bits to determine if there is a one.

26. The method according to claim 25 further comprising the step of determining if an exponent increment is necessary in accordance with the determination of said first ones detect and a carry signal output from the adder utilizing said detection controller.

27. The method according to claim 21 further comprising the step of, when the exponent of the first operand exceeds the exponent of the second operand and an adder subtracts the first operand from the second operand, controlling said third bit field with said detection controller to input a predetermined number of bits of the first operand minus the leading one.

28. The method according to claim 27 further comprising the step of controlling a second ones detect with said detection controller to examine the bits within said third bit field to determine if there is a one.

29. The method according to claim 28 further comprising the step of controlling a first ones detect with said detection controller to sequentially examine a first, second, third, and fourth words of said first bit field to determine if there is a one.

30. The method according to claim 29 further comprising the step of determining if an exponent increment is required in accordance with a carry signal from the adder, the determinations of said first ones detect except for the word including the leading one, and the determination of said second ones detect substituted in the place of the word including the leading one utilizing said detection controller.

* * * * *

UNITED STATES PATENT AND TRADEMARK OFFICE
CERTIFICATE OF CORRECTION

PATENT NO. : 5,471,410

DATED : November 28, 1995

INVENTOR(S) : Bailey et al

It is certified that error appears in the above-identified patent and that said Letters Patent is hereby corrected as shown below:

In claim 1, line 10, after "the, first occurrence, insert --output--.

Signed and Sealed this

Twenty-second Day of April, 1997

*Attest:*

BRUCE LEHMAN

*Commissioner of Patents and Trademarks*

*Attesting Officer*